US011653193B1

(12) United States Patent
King et al.

(10) Patent No.: US 11,653,193 B1
(45) Date of Patent: May 16, 2023

(54) COMMUNICATION SYSTEM AND METHOD FOR CONTROLLING ACCESS TO PORTABLE RADIO PUBLIC SAFETY SERVICE APPLICATIONS (71) Applicant: MOTOROLA SOLUTIONS, INC., Chicago, IL (US)

(72) Inventors: Melanie King, Plantation, FL (US); Clarence Kevin Coffee, Pembroke Pines, FL (US); Friedrich Bollmann, Birkenwerder (DE); Divya Ramamoorthy, Cooper City, FL (US); David Weygandt, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/644,099

(22) Filed: Dec. 14, 2021

(51) Int. Cl.
*H04W 4/90* (2018.01)
*H04W 12/30* (2021.01)
*H04W 12/06* (2021.01)
*H04W 4/80* (2018.01)

(52) U.S. Cl.
CPC .............. *H04W 4/90* (2018.02); *H04W 4/80* (2018.02); *H04W 12/06* (2013.01); *H04W 12/30* (2021.01)

(58) Field of Classification Search
CPC ................................ H04W 4/80; H04W 12/00
See application file for complete search history.

(56) References Cited

U.S. PATENT DOCUMENTS

| 6,122,528 | A | * | 9/2000 | Garcia | H04M 1/72406 455/418 |
| 2009/0293120 | A1 | * | 11/2009 | Feng | G08B 13/1427 726/21 |
| 2010/0093329 | A1 | * | 4/2010 | Lee | H04M 1/72448 715/764 |
| 2011/0028091 | A1 | * | 2/2011 | Higgins | H04L 63/0492 455/41.2 |
| 2011/0056108 | A1 | * | 3/2011 | McCord | F41A 17/066 40/633 |
| 2014/0365782 | A1 | * | 12/2014 | Beatson | G06V 40/50 713/186 |
| 2015/0143492 | A1 | * | 5/2015 | Berry | H04W 12/065 726/7 |
| 2017/0160041 | A1 | * | 6/2017 | Stewart | F41C 23/22 |
| 2017/0300678 | A1 | * | 10/2017 | Metke | H04W 12/068 |
| 2019/0236739 | A1 | * | 8/2019 | Ganete | G06F 16/27 |
| 2020/0045529 | A1 | * | 2/2020 | Bryla | H04W 4/90 |

(Continued)

OTHER PUBLICATIONS

YARDARM—Automatically Detect Holster Events, http://www.yardarmtech.com/, downloaded from the internet—Dec. 10, 2021, all pages.

*Primary Examiner* — Wen W Huang
(74) *Attorney, Agent, or Firm* — Barbara R. Doutre (57) ABSTRACT

A communication system and method are provided for authenticating a portable radio from a plurality of shared portable radios. The authentication controls access to user personal profiles and public safety service applications associated with a public safety agency. A firearm having a firearm user ID stored therein, communicates the firearm user ID over short range communications to the portable radio. The firearm user ID may be used for single factor authentication or combined with a PIN entry for multi-factor authentication.

31 Claims, 4 Drawing Sheets

(56) References Cited

U.S. PATENT DOCUMENTS

2021/0058405 A1\* 2/2021 Zhang ................... H04L 63/12
2021/0185138 A1   6/2021 Gant
2022/0030420 A1\* 1/2022 Wong ................... H04W 8/005

\* cited by examiner

COMMUNICATION SYSTEM AND METHOD FOR CONTROLLING ACCESS TO PORTABLE RADIO PUBLIC SAFETY SERVICE APPLICATIONS

BACKGROUND

Portable radios, particularly those used in public safety environments such as law enforcement, continue to offer new and improved features. Access to certain radio features may need to be limited to those public safety personnel having proper authority and permissions. Hence, user identification and/or authentication are important aspects to protecting the security of a portable radio. However, challenges may arise within the context of shared portable radios, where multiple users may have access to the same group of radios, where different portable radio users may not have the same access permissions to all radio features of the shared radios. For example, shared portable radios of a police department may change hands at an end of shift without an awareness of which user is obtaining which radio, Sending authentication codes and confirmation texts to an external device, such as a cell phone or computer, to authenticate a portable radio is tedious and impractical for public safety users. First responders already carry several pieces of equipment, so it would be desirable that any proposed approach minimize the need for additional equipment to be carried by the user.

Accordingly, it would be desirable to provide an improved technical approach to radio authentication. The ability to enable such an approach without having to carry an additional piece of equipment would be a benefit to first responders.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a communication system and technical method to control access to portable radio public safety service applications in shared portable radios. As public safety radios have more capabilities and connectivity there is an increasing need to integrate multi-factor authentication (MFA) to protect user information and higher level public safety service applications. Shared portable radios present a challenge in that each user has their own user profile with user ID and preferred radio settings, as well as different users may or may not be approved for access to higher level public safety service applications. MFA requires at least two authenticators from a different factor: something you know, something you have, and/or something you are. For radios that are shared, the factor "something you are" is not practical. Additionally, for first responders that already carry several items, it is unreasonable to expect them to carry and not lose an additional authentication item. The embodiments provided herein provide for the integration of a keyfob function in the firearm, making the firearm the "something they have". Law enforcement personnel may share radios, but they do not share their firearms and do not typically lose their firearms, Hence, the multi-factor authentication can be greatly simplified for the portable radio user by using the firearm as part of the authentication process.

In accordance with an example embodiment, a communication system is provided which includes a plurality of shared portable radios selectable by a plurality of users and a firearm having a firearm user ID stored electronically therein. The firearm wirelessly couples to a user selected portable radio over a short range communications link to transfer the firearm user ID to the user selected portable radio, the firearm user ID being used for authentication of the user selected portable radio.

In accordance with another example embodiment, a communication system is provided which includes a portable radio having a controller, a public safety radio communications transceiver and a short range communications transceiver integrated therein. The communication system further includes a firearm having a firearm user authentication module with a firearm user identification (ID) stored therein, the firearm further including a short range communications transceiver which is compatible with the short range communications transceiver of the portable radio. The firearm user ID is communicated, using short range communications, to the portable radio, the firearm user ID enabling one of: a single factor authentication for accessing a first level of public safety service applications; and a multi-factor authentication further including a PIN entry to the portable radio for accessing the first level of public safety service applications and a second level of higher security public safety service applications.

In accordance with another example embodiment, a method of controlling access to portable radio public safety service applications within a communication system is provided. The method begins with selecting a portable radio from a plurality of portable radios, the plurality of portable radios being operable as part of a law enforcement agency. The method continues with bringing the portable radio within a predetermined distance of a firearm, the firearm having a short range communications transceiver and an authentication module with firearm user ID stored therein. Short range communications are activated in response to the portable radio being brought within the predetermined distance of the firearm. The method continues by determining, based on the firearm user ID and a user profile for the portable radio, if the user is configured for single factor authentication or multi-factor authentication. In response to determining that the user is configured for single factor authentication, then access to a first level of public safety service applications associated with the portable radio is provided. In response to determining that the user is configured for multi-factor authentication, then a request for an additional authentication entry to the portable radio is generated, the additional authentication entry to portable radio is received, and access to the first level of public safety service applications and a secondary level of higher security public safety service applications is provided.

Each of the above-mentioned embodiments will be discussed in more detail below, starting with example system and device architectures of the system in which the embodiments may be practiced, followed by an illustration of processing blocks for achieving an improved technical method, device, and system for electronic authentication of a portable radio in a communication system of shared portable radios.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
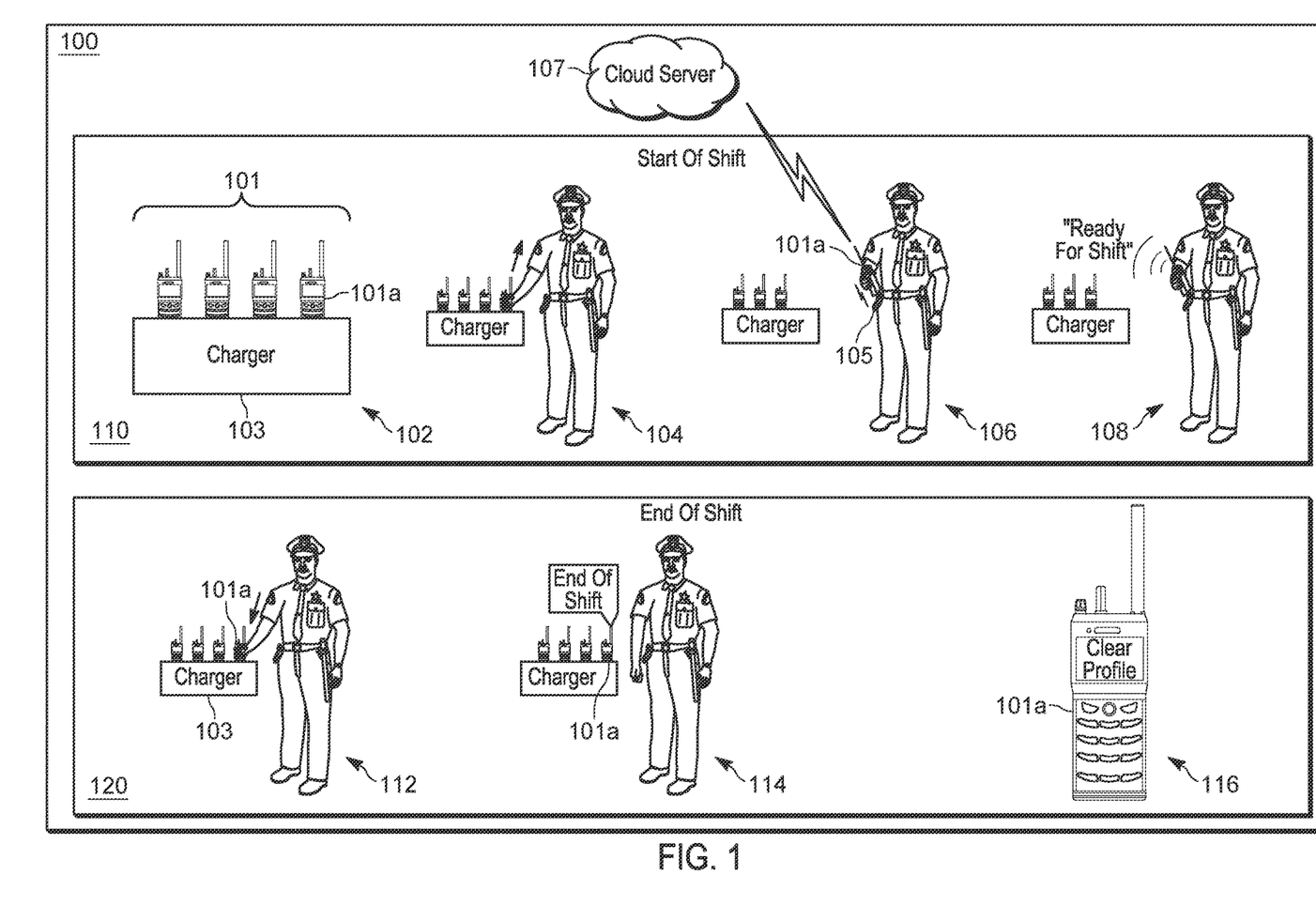
FIG. 1 illustrates a communication system that controls access to portable radio public safety service applications through an authentication process in accordance with some embodiments.

FIG. 1 illustrates a communication system 100 that controls access to portable radio public safety service applications through an authentication process in accordance with some embodiments. Communication system 100 is preferably a public safety communication system. The communication system 100 includes a plurality of portable radios 101 and a firearm 105. For the purposes of this application, the plurality of portable radios 101 are considered shared radios, where radios may be used for a work shift by any approved user and returned to the agency at the end of the shift, for use by another user. Hence, the portable radio may be an agency radio shared amongst a plurality of agency users, while the firearm is associated with a single user of the agency At the start of a shift 110, the plurality portable radios 101, which may be public safety radios, are available for selection. In view 102, the plurality of portable radios 101 are shown docked within a charger 103, such as a multi-unit charger of a law enforcement agency, where the portable radios may also be placed at the end of a shift. It is to be appreciated that the plurality of portable radios 101 need not reside within the charger 103 in order for the authentications embodiments to be applied. The plurality of portable radios may be located at various places within the law enforcement agency, such as at a portable radio maintenance station or elsewhere within the agency, where secure communication from a server, such as a cloud based law enforcement server 107 to the portable radio may take place.

At view 104, a portable radio user, such as a police officer or other law enforcement agent, may select a portable radio, such as portable radio 101a, from the plurality of portable radios 101. At view 106, the portable radio 101a is brought within a predetermined distance of the officer's firearm 105, for example by tapping the portable radio to the firearm, to trigger the short range communications (e.g. near field communications (NFC), ultra-wide band (UWB) communications, or the like). The firearm 105 includes a firearm user ID, associated with a particular user, stored electronically therein, such as within an authentication module within the firearm handle. The firearm user ID is transferred from the firearm 105 to the portable radio 101a over the short range communications link. Since firearms are not shared, the firearm user ID can be advantageously used as a factor in the authentication process.

Depending on the firearm user ID, and the level of access accorded to an approved user, either single factor authentication or multi-factor authentication of the portable radio may be required. Three use cases are provided below, all of which rely on the firearm user ID.

In the first use case: the officer removes any portable from a group of portable radios at 104. The officer taps the portable radio 101a to the firearm 105, at 106. The firearm user ID is communicated to the portable radio. The portable radio then communicates with the cloud based server 107, to download a radio codeplug for that firearm user ID. The radio is now ready to be used by officer as a result of this single factor authentication (firearm something the officer has). The radio code plug includes user radio ID, user profiles (such as preferred radio settings (volume/channel, talkgroup settings, etc.) and in accordance with this embodiment, the radio codeplug may further contain a first level of service applications (e.g. smart mapping and smart messaging) permitted for this user. The user will not have access to second level higher level security service applications that require multi factor authentication.

In the second use case: the officer removes any portable radio (e.g. 101*a*) from a group of portable radios 101. The officer taps the portable radio 101*a* to the firearm 105. The firearm communicates to the portable radio identifying who the firearm user is, and then the radio communicates that firearm user ID to the server 107. The server then downloads a radio codeplug for that firearm user ID, and that radio codeplug will indicate if the user needs authentication or not. If no authentication is needed, then the use case is the same as the first use case above. If authentication for this user is needed, the portable radio 101*a* will alert the user (via voice, tone, or text) to the need for a two-factor authentication. For example, the user may tap again (firearm is something officer owns) and enter a PIN (something officer knows). In this second use case, the firearm identifies the user so that a radio codeplug for that user is downloaded to the radio, and to access that downloaded radio codeplug the two-factor authentication is needed. Hence, the firearm is behaving as a security token (via the second tap) to be used as one of the factors of the multifactor authentication and the PIN number entry to the radio is another factor of the multifactor authentication to authenticate the user. In accordance with this second use case, the radio codeplug is configured to provide both the first level of service applications (e.g. smart mapping and smart messaging) and a higher level of secondary service applications (e.g. virtual partner). Multi factor authentication requires at least two authenticators from a different factor: something you have, something you know, or something you are. The firearm is something the officer has and the PIN is something the officer knows.

In the third use case: an officer removes any portable radio (e.g. 101*a*) from a plurality of portable radios 101. The portable radio, in this third use case, contains a generic codeplug for that agency (the generic codeplug is not downloaded from the server). The user is able to immediately access the generic applications of the generic code plug (e.g. voice control, ptt) without any login authentication. To access the more secure applications stored within the generic code plug (e.g. mapping app, bank app, virtual partner, the user taps the portable radio to his/her firearm, the firearm communicates the firearm user ID to the portable radio, and then the radio communicates that firearm user ID to the server 107. The server then communicates with the radio indicating that the user should next enter his/her PIN. The PIN is verified by the server and the user is now able to access the secure applications stored within the generic code plug.

In all three use cases, the officer's firearm 105 operates as a keyfob in combination with the portable radio so that an approved user can be authenticated and gain access to portable radio public safety service applications. All three use cases advantageously provide for the firearm user ID being used to enable one of: a single factor authentication for accessing a first level of public safety service applications, and a multi-factor authentication further including a PIN entry to the portable radio for accessing the first level of public safety service applications and a second level of higher security public safety service applications.

At the end of shift 120, the user may dock the portable radio 101*a* in the charger 103, as shown at view 112. The user may dock the portable radio 101*a* within any available charger pocket of charger 103. The portable radio 101*a* will sense, such as through corresponding charge contacts, that the portable radio has been docked within the charger 103.

In response to being docked in the charger, the portable radio will automatically clear the user profile and removes access to the public safety security applications. A message may be played stating such confirmation, as "end of shift", "goodbye Officer Natalie" or some other appropriate indicator as shown at view 114. The codeplug is then automatically cleared and a message, such as "user profile cleared" or similar message may be displayed or otherwise communicated to the user, as shown at view 116.

If not returning 101*a* the radio to the charger 103, the user may use a predetermined command such as an "end of shift" command, and the portable radio will generate an audio or display confirmation indicating an "end of shift" response and/or "profile cleared" response at view 116. In other words, the portable radio need not be placed in the charger at end of shift in order to clear the user profile and remove access to the public safety security applications. Configurable audio feedback and user commands can be used to personalize, the end of shift conversion. For example, an audio feedback identifying the officer by name "e.g. goodbye Officer Natalie" will ensure that the office is aware that the officer's profile information and access to public safety service applications have been cleared.

Clearing of the profile at 116 may further return the radio to a default mode of operation providing basic radio functionality without user profile customization and will not include first or second level access to public safety serve applications.

Figure 2:
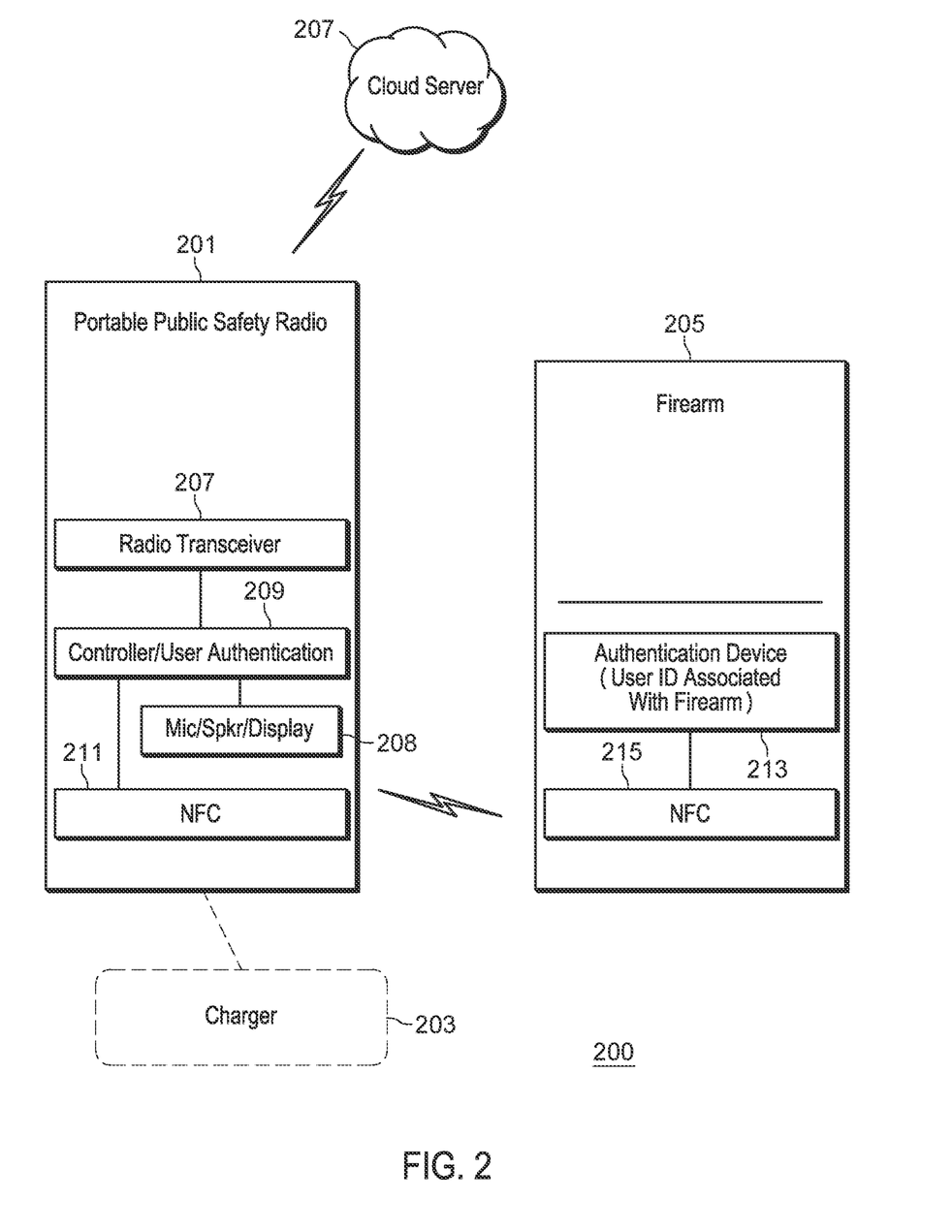
FIG. 2 is a block diagram of a communication system in accordance with some embodiments.

FIG. 2 is a block diagram of a communication system 200 in accordance with some embodiments. Communication system 200 includes elements representing one or more of the elements discussed in FIG. 1. Communication system 200 includes portable radio 201 and firearm 205. The communication system may further include an agency multiunit charger 203 and a cloud based server 207. As mentioned previously, the charger 203 is not required for authentication but does provide an advantageous location to dock a plurality of the shared radios at end of shift.

The portable radio 201 includes a controller 209 for managing the authentication, a public safety radio communications transceiver, such as an LMR transceiver, and a short range communications transceiver, such as a near field communications (NFC) module 211, UWB module, or the like, integrated therein. The portable radio 201 further includes audio circuitry and user interface features, including a microphone, speaker, and display 208.

The firearm 205 includes a firearm user authentication module 213 with a firearm user identification (ID) stored therein. The firearm 205 further includes a short range communications transceiver compatible with the short range communications transceiver of the portable radio. such as a near field communications (NFC) module 215. The NFC module may be located, for example, in the handle of the firearm. The authentication module 213 may include, for example, a token that identifies the firearm owner or some other module containing a firearm user ID.

The respective short range communications modules 211, 215 enable the portable radio 201 and firearm 205 to communicate over short distances using a short range communications link. For example, near field communications may be enabled by bringing the radio in close proximity to the firearm handle, such as within 4 cm or less of the handle, or by a tap of the portable radio 201 to the firearm handle. Since the firearm user ID is unique to its individual owner, and since firearms are not generally shared, the firearm user ID provides a strong authentication factor that can be used for single factor authentication or as part of a multi-factor authentication of the portable radio.

In response to the portable radio being brought within a predetermined distance of the firearm (or tapping the radio to the firearm), the firearm user ID is communicated, using the short range communications, from the firearm 205 to the portable radio 201. In accordance with the embodiments, the firearm user ID enables one of: a single factor authentication for accessing a first level of portable radio service applications; and a multi-factor authentication further requiring a PIN entry to the portable radio for accessing the first level of portable radio service applications and a second level of higher security public safety service applications.

In accordance with the embodiments, the agency server is configured to receive the firearm user ID from the portable communication device; download a radio codeplug associated with the firearm user ID, the radio codeplug indicating if a user associated with the firearm user ID requires multi-factor authentication; and when the user associated with the firearm user ID does require multi-factor authentication, generate a request for a PIN entry to the portable radio. If only single factor authentication is required then no PIN entry is needed.

The approved user identifications and associated authentication requirement may be stored, for example, in a codeplug, and that codeplug may be managed by the cloud based server 207. For example approved radio user IDs for police officers of a police department, their associated authentication requirement (none, single factor, or multi-factor) may be stored in the codeplug. The user identifications and associated authentication requirement may be downloaded from the cloud based server 207 to the portable radio 201 in response to the initial firearm user ID being associated with an approved radio user ID In some embodiments, the public safety service applications may be stored in the codeplug managed by the cloud based server 207, and downloaded in accordance with the single or multi-factor authentication requirement for that user.

In other embodiment, the public safety service applications may reside within the portable radio itself, and the access to those applications is controlled based on either the single or multi-factor authentication required for a particular user.

In response to the tap, user identification from the firearm matches one of the many stored user identifications within the portable radio. In response to the match, the certain predetermined levels of portable radio features may be accessed by the officer. For example, a first level of access to portable radio public safety service applications (e.g. smart mapping and smart messaging) may be granted to a user based on identification alone.

A second level of portable radio public safety service applications (e.g. virtual partner) may be accessed by a different identified officer having an additional authentication profile, the authentication profile being provided as a second MFA. The portable radio may provide access to a secondary level of higher security public safety service applications (e.g. virtual partner) in response to 1) a tap of the radio to the firearm (e.g. handle), which transfers firearm user ID (something you own), the authentication requirement for that approved user is downloaded to the radio which then triggers an automated request for a secondary authentication to be entered. For example, the portable radio asks for PIN (something you know) and then authenticates the portable radio for use by that identified and authenticated user. The second level higher security level public safety service applications can then be accessed.

Radios may be returned at an end of shift without knowledge of which user will use which radio in the next shift. User profiles will be cleared and access to the first and second public safety service applications will be removed, either through user command entry to the portable radio or automatically when docked in the charger 203.

Figure 3:
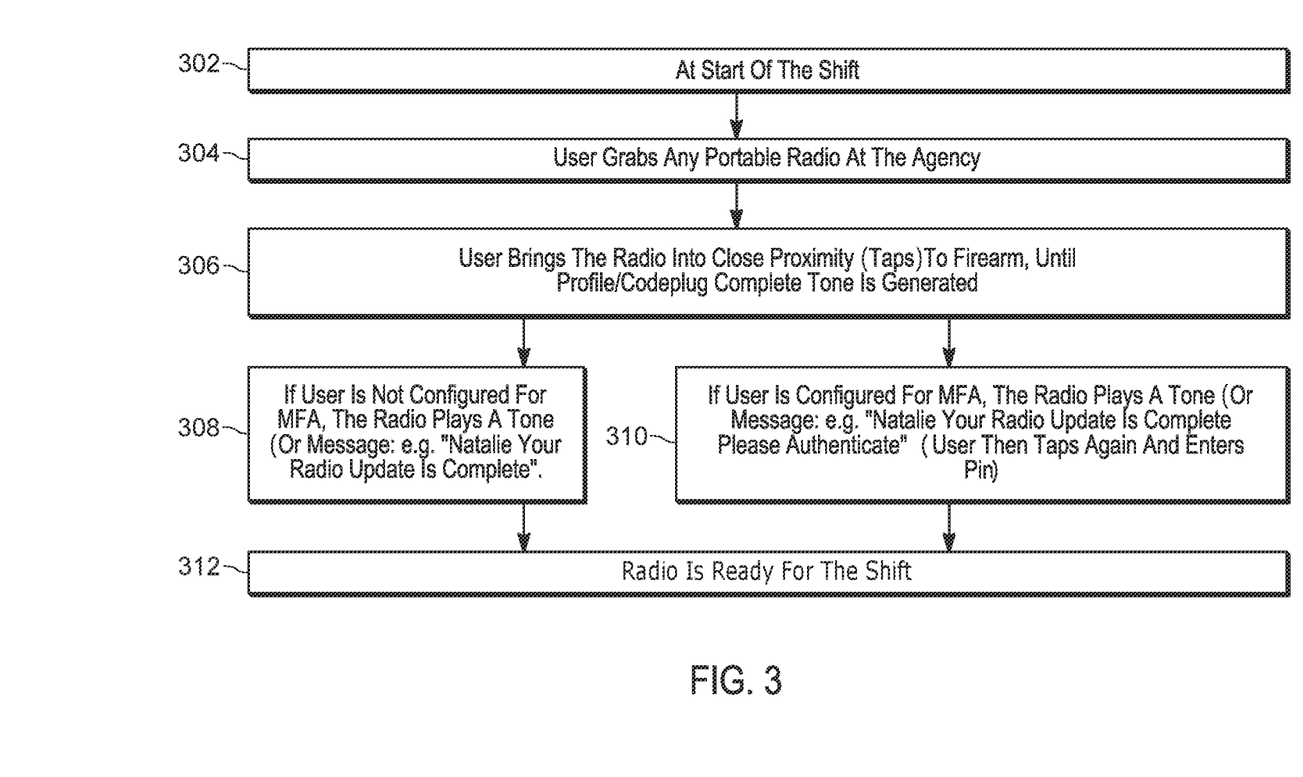
FIG. 3 is a flowchart for a method of controlling access to portable radio public safety service applications in accordance with some embodiments.

FIG. 3 is a flowchart for a method 300 of controlling access to portable radio public safety service applications in accordance with some embodiments. Beginning at 302, a plurality of public safety personnel, such a department of police officers, start their shift with each user selecting at 304 a portable radio from a plurality of portable radios, the plurality of portable radios being shared portable radios of a law enforcement agency. Any of the officers may select any of the portable radios and each officer is considered a user for that selected portable radio. A user brings the portable radio into close proximity to his/her firearm at 306, until a tone is heard. For example, the portable radio may be brought within a predetermined distance of 4 cm or less of the firearm, or by tapping the firearm near a location where the firearm identification information is stored, such as the handle of the firearm. The tone is generated to indicate that short range wireless communication, such as NFC or UWB communications, have been established and a determination is made, based on the firearm user ID, as to whether the user is configured for single factor authentication or multi-factor authentication;

Two potential paths may take place, depending on the user configuration of portable radio user. For the first path at 308, in response determining that the user is configured for single factor authentication, access to a first level of public safety service applications associated with the portable radio is provided, along with the user's personal profile. A message or tone plays out the user's name, stating, for example, "Officer Natalie, your radio update is complete" to alert the officer that the portable radio is ready to use.

For the second path at 310, in response determining that the user is configured for multi-factor authentication, the portable radio generates a request for an authentication entry. For example, a message may be played out at the portable radio stating: "Officer Natalie, your radio update is complete, please authenticate". The authentication request is satisfied by a second tap of the portable radio to the firearm and an authentication entry by the user to the portable radio. For example, the user will, in response to the authentication request, tap (or bring within close proximity) the portable radio to the firearm and enter an authentication entry, such as the PIN (something the officer knows). Upon receiving the additional authentication entry, the portable radio provides access to the first level of public safety service applications and a secondary level of higher security public safety service applications, along with the user's personal profile. An authentication complete or other indicator indicating that the portable radio is ready to use is provided at 312. Audible indicators and/or visual indicators may be utilized throughout the method 300.

The same portable radio, such as portable radio 201 of FIG. 2 can thus be shared by many different users over different shifts and provide appropriate access to secure public safety service applications based on the firearm user ID. First level access can be based on firearm ID alone (i.e. firearm user ID matches user radio ID). Increased access to more secure applications can be provided with additional protection by the additional authentication factor (e.g. firearm user matches radio user ID and a PIN entry to the portable radio by the user).

Figure 4:
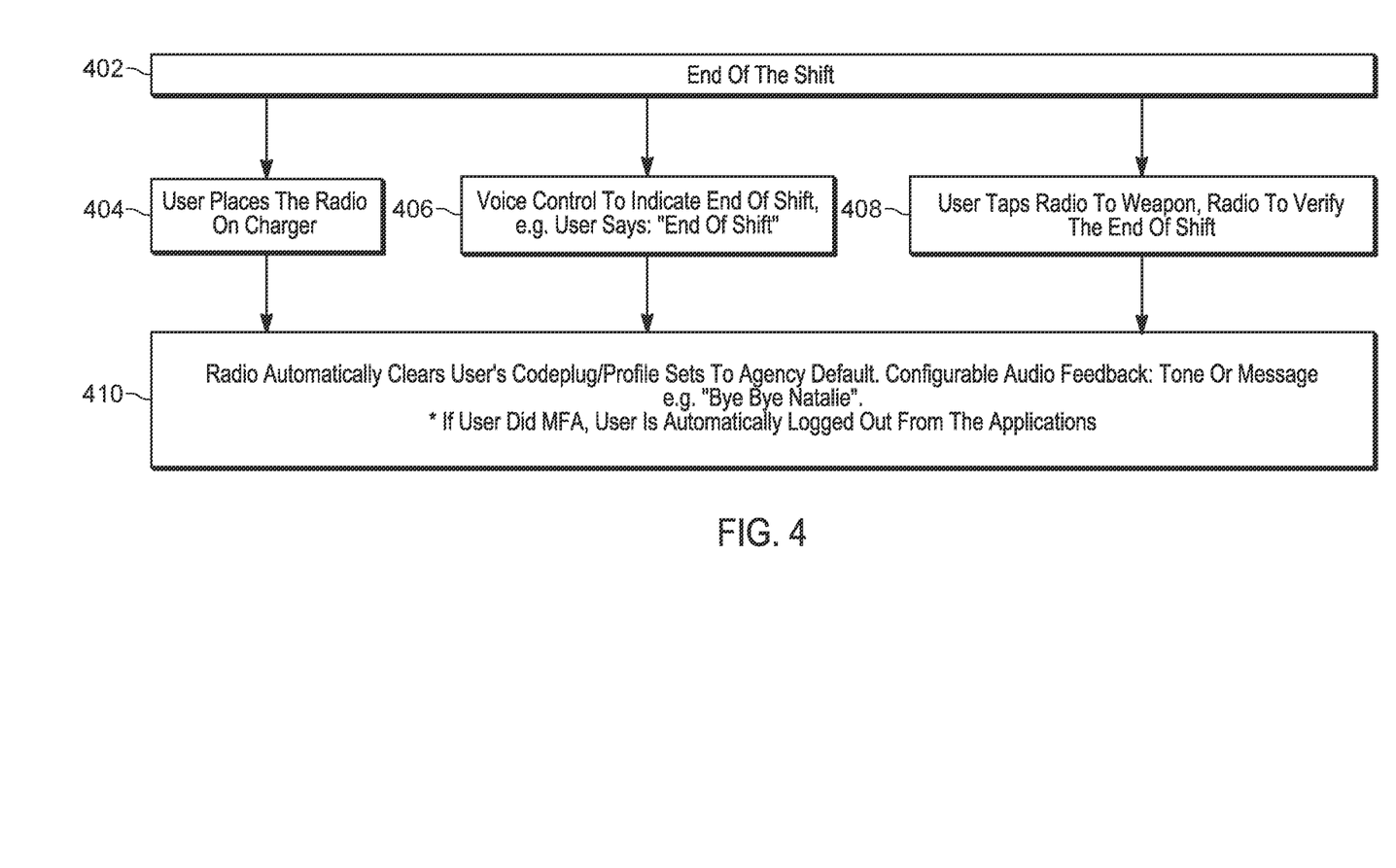
FIG. 4 is a flowchart for a method of removing access to the portable radio public safety service applications in accordance with some embodiments.

FIG. 4 is a flowchart for a method of removing access to the portable radio public safety service applications in accordance with some embodiments. The method begins at change of shift 402, where one of three potential paths 404, 406, and 408 may take place.

At 404, a user place the portable radio in a charger (such as previously described), and the portable radio automatically clears the user profile and removes access to the public safety security applications. A message may be played indicative of such confirmation, for example "Goodbye Officer Natalie." At 406, a user may use a voice control command to state "end of shift." At 408, a user may use a tap the radio to the firearm, and the radio may, in response, thereto generate an audio or display confirmation indicating an "end of shift". In other words, the radio need not be placed in the charger at end of shift in order to clear the user profile and remove access to the public safety security applications.

At 410, the portable radio clears the user profile and places the radio in a default mode. A configurable audio feedback to that user can be generated, such as "bye bye Natalie" so that each use is aware that they have been logged out and profile cleared. For MFA service applications, the user will be automatically logged out, and the default mode will not include first or second level access.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot provide authentication based on firearm user ID or firearm user ID with PIN entry among other features and functions set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A public safety communication system, comprising:
   a plurality of shared portable radios selectable by a plurality of users;
   a firearm having a firearm user ID stored electronically therein; and
   the firearm being wirelessly coupled to a user selected portable radio over a short range communications link to transfer the firearm user ID to the user selected portable radio, the firearm user ID being used for authentication of the user selected portable radio.

2. The communication system of claim 1, wherein the firearm user ID in conjunction with a PIN entry to the selected portable radio provides multi-factor authentication of the portable radio.

3. The communication system of claim 2, wherein the multi-factor authentication controls access to a personal profile and public safety service applications associated with the selected portable radio.

4. The communication system of claim 3, wherein the personal profile is cleared from the selected portable radio in response to docking the selected portable radio in a charger or entering a predetermined command at the portable radio.

5. The communication system of claim 1, wherein the short range communications link is enabled by a first tap of the selected portable radio to the firearm to enable respective short range wireless communication modules of each of the portable radio and firearm, and transfer the firearm user ID from the firearm to the selected portable radio.

6. The communication system of claim 5, wherein multi-factor authentication is enabled by a second tap of the selected portable radio to the firearm and a PIN entry to the selected portable radio.

7. The communication system of claim 1, wherein the firearm user ID is wirelessly transferred from the firearm to the user selected portable radio without additional equipment.

8. The communication system of claim 1, wherein the firearm user ID is used for radio authentication of the user selected portable radio without impacting firearm functionality.

9. The communication system of claim 1, wherein the user selected portable radio communicates with a cloud based server to download a radio codeplug associated with the firearm user ID, the radio codeplug including user radio ID, user profiles for preferred radio settings, and permissions to a first level of service applications.

10. A communication system, comprising:
    a portable radio having a controller, a public safety radio communications transceiver and a short range communications transceiver integrated therein;
    a firearm having a firearm user authentication module with a firearm user identification (ID) stored therein, and further comprising a short range communications transceiver integrated therein, the short range communications transceiver of the firearm being compatible with the short range communications transceiver of the portable radio;
    the firearm user ID being communicated, using short range communications, to the portable radio, the firearm user ID enabling one of:
    a single factor authentication for accessing a first level of public safety service applications; and
    a multi-factor authentication further including a PIN entry to the portable radio for accessing the first level of public safety service applications and a second level of higher security public safety service applications.

11. The communication system of claim 10, wherein the first level of public safety service applications comprises smart mapping and smart messaging; and the second level of higher security public safety service applications comprises virtual partner.

12. The communication system of claim 10, wherein the portable radio is an agency radio shared amongst a plurality of agency users, and the firearm is associated with a single user of the agency.

13. The communication system of claim 10, wherein the portable radio is a public safety radio shared amongst a plurality of law enforcement users of a law enforcement agency, and the firearm is associated with a single user of the law enforcement agency.

14. The communication system of claim 13, further comprising:
    an agency server for communicating with the portable radio.

15. The communication system of claim 14, wherein the agency server is configured to:
- receive the firearm user ID from the portable radio;
- download a radio codeplug associated with the firearm user ID, the radio codeplug indicating if the firearm user ID requires multi-factor authentication; and
- when firearm user ID does require multi-factor authentication, generate an authentication request at the portable radio.

16. The communication system of claim 15, wherein the authentication request is satisfied by a second tap of the portable radio to the firearm and a PIN entry to the portable radio.

17. The communication system of claim 13, wherein the short range communications are triggered by a tap of the portable radio to the firearm which enables the short range communications, in response thereto, and the firearm user ID is transferred to the portable radio.

18. The communication system of claim 10, wherein the short range communications comprise one of:
- near field communication (NFC); and
- ultra-wide band (UWB) communication.

19. The communication system of claim 10, wherein either single factor authentication or multi-factor authentication further includes providing access to a personal profile associated with the user, and the personal profile is cleared in response to one of:
- docking the portable radio in a charger to automatically clear the personal profile; and
- entering a predetermined command at the portable radio to clear the personal profile.

20. The communication system of claim 10, wherein the firearm user ID is communicated, without additional equipment, using short range communications, to the portable radio.

21. The communication system of claim 10, wherein the firearm user ID is used for radio authentication of the user selected portable radio without impacting firearm functionality.

22. The communication system of claim 10, wherein the portable radio communicates with a cloud based server to download a radio codeplug associated with the firearm user ID, the radio codeplug including user radio ID, user profiles for preferred radio settings, and permissions to a first level of service applications.

23. A method of controlling access to portable radio public safety service applications, comprising:
- selecting a portable radio from a plurality of portable radios, the plurality of portable radios being operable as part of a law enforcement agency;
- bringing the portable radio within a predetermined distance of a firearm, the firearm having a short range communications transceiver and an authentication module with firearm user ID stored therein;
- activating short range communications in response to the portable radio being brought within the predetermined distance of the firearm;
- determining, based on the firearm user ID, if the user is configured for single factor authentication or multi-factor authentication;
- in response to determining that the user is configured for single factor authentication, providing access to a personal profile and first level of public safety service applications associated with the portable radio; and
- in response to determining that the user being configured for multi-factor authentication:
  - generating an authentication request at the portable radio;
  - receiving an authentication entry at portable radio; and
  - providing, in response to the authentication entry, access to a user profile and the first level of public safety service applications and a secondary level of higher security public safety service applications.

24. The method of claim 23, wherein selecting the portable radio from the plurality of portable radios comprises:
- removing a portable radio from an agency multi-unit charger having a plurality of portable radios docked therein.

25. The method of claim 24, further comprising:
- returning the portable radio to the agency multi-unit charger to clear the access and return the portable radio to a default mode of operation.

26. The method of claim 23, wherein bringing the portable radio within a predetermined distance of the firearm comprises:
- tapping the portable radio to the firearm activate the short range communications.

27. The method of claim 23, wherein the authentication entry for the multi-factor authentication comprises:
- tapping the portable radio to the firearm to activate the short range communications; and
- entering a PIN to the portable radio.

28. The method of claim 23, wherein each firearm is used by a single user, and the plurality of portable radios are shared by a plurality of users of an agency.

29. The method of claim 23, wherein the firearm user ID is wirelessly transferred from the firearm to the user selected portable radio without additional equipment.

30. The method of claim 23, wherein the firearm user ID is used for radio authentication of the user selected portable radio without impacting firearm functionality.

31. The method of claim 23, wherein the access to the personal profile and first level of public safety service applications associated with the portable radio are downloaded as a radio codeplug associated with the firearm user ID, the radio codeplug including user radio ID, user profiles for preferred radio settings, and permissions to the first level of public safety service applications.

* * * * *